Oct. 2, 1951  S. W. TRAYLOR, JR  2,570,082
SUPPORT FOR ROTARY KILNS
Filed Sept 23, 1948  3 Sheets-Sheet 1
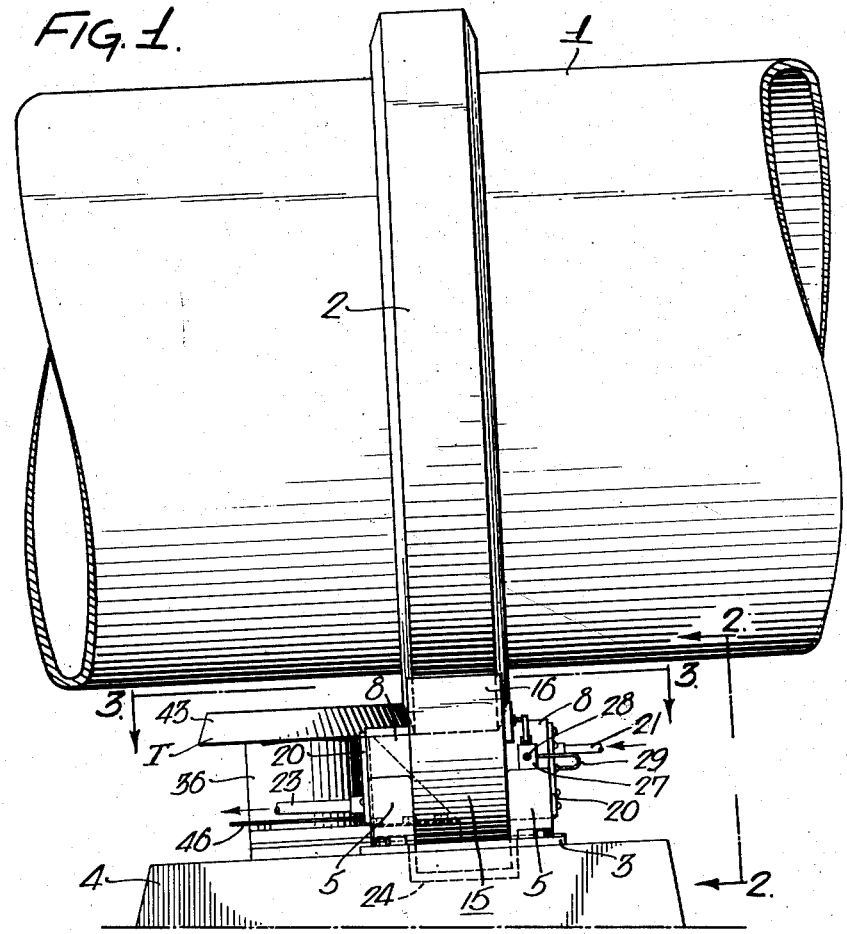
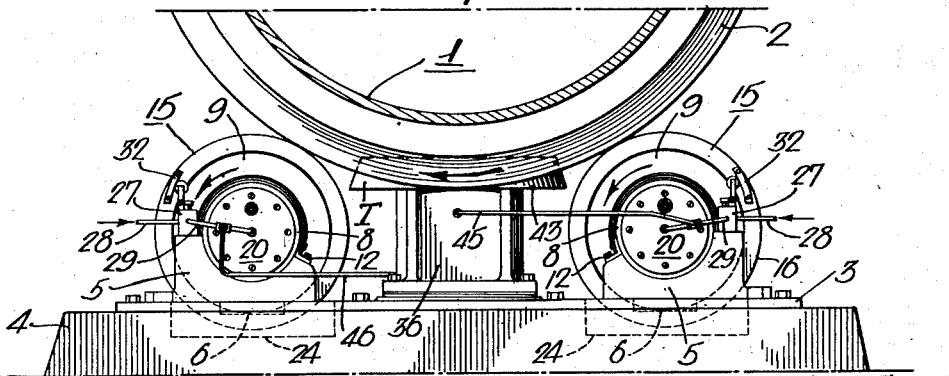
Inventor:
Samuel W. Traylor Jr.
by his Attorneys
Howson & Howson Oct. 2, 1951 S. W. TRAYLOR, JR 2,570,082
SUPPORT FOR ROTARY KILNS
Filed Sept. 23, 1948 3 Sheets-Sheet 2
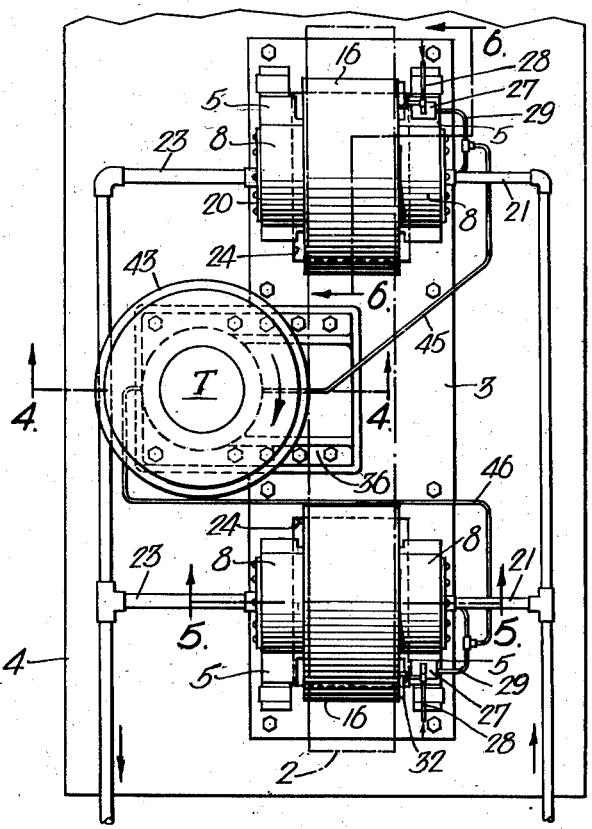
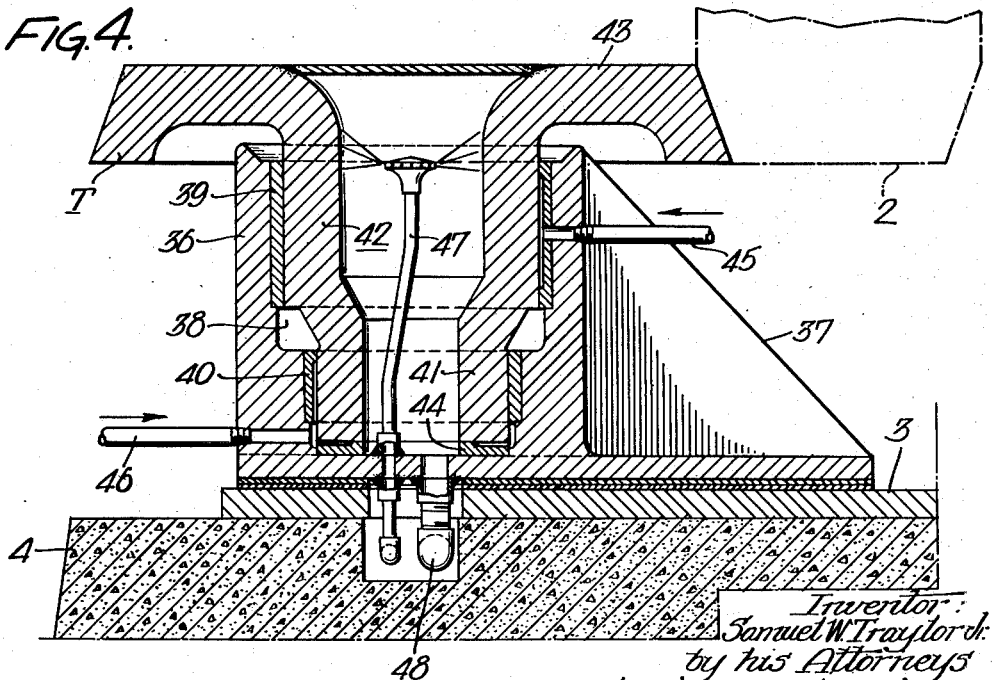
Inventor:
Samuel W. Traylor Jr.
by his Attorneys
Howson & Howson Oct. 2, 1951 S. W. TRAYLOR, JR 2,570,082
SUPPORT FOR ROTARY KILNS Filed Sept 23, 1948 3 Sheets-Sheet 3

Inventor:
Samuel W. Traylor Jr.
by his Attorneys
Howson & Howson

Patented Oct. 2, 1951

2,570,082

UNITED STATES PATENT OFFICE 2,570,082

SUPPORT FOR ROTARY KILNS

Samuel W. Traylor, Jr., Allentown, Pa.

Application September 23, 1948, Serial No. 50,747

16 Claims. (Cl. 308—76)

This invention relates to new and useful improvements in rotary kilns, coolers and driers. More particularly the present invention relates to new and useful improvements in self-aligning bearing constructions for the support and thrust rollers of such equipment.

In conventional type rotary kilns and like equipment having the usual riding rings it is the practice to rotationally support the kilns by means of roller supports and thrust rollers which are engaged by the riding rings on the kilns. Customarily these kilns and similar equipment have a slight longitudinal pitch and any misalignment between the axes of the riding ring and the supporting rollers would cause the kiln to be spiralled or twisted in the downhill or uphill direction depending upon the direction of any such misalignment of the ring and its supporting rollers.

With the foregoing in mind, one object of the present invention is to provide a novel self-aligning bearing construction and roller support for rotary kilns and like equipment which completely eliminates any possibility of misalignment between the riding ring and the roller supports.

Another object of the invention is to provide a self-aligning bearing construction as set forth wherein the bearing member is stationary and the support rollers are rotatably mounted on the fixed bearing member.

Another object of the invention is to provide a novel thrust roller and bearing construction for rotary kilns and the like which may be designed to support the calculated loads at the downhill side of the riding ring.

Another object of the invention is to provide in conjunction with the aforesaid bearing constructions novel means for liquid cooling the said constructions interiorly thereof.

A further object of the present invention is to provide in conjunction with bearing constructions of the type described novel means for effecting forced lubrication of the bearing parts.

Still a further object of the invention is to provide novel bearing and roller constructions for supporting the riding rings of rotary kilns and like apparatus which are of comparatively simplified and inexpensive construction and which are highly efficient and foolproof in operation and use.

These and other objects of the invention and the various features and details of the construction and operation thereof are hereinafter fully set forth and described with reference to the accompanying drawings, in which:

Fig. 1 is a side elevational view of part of a rotary kiln mounted upon support and thrust roller constructions made according to the present invention;

Fig. 2 is a view taken on line 2—2, Fig. 1;

Fig. 3 is a view taken on line 3—3, Fig. 1;

Fig. 4 is an enlarged sectional view on line 4—4, Fig. 3;

Figure 5:
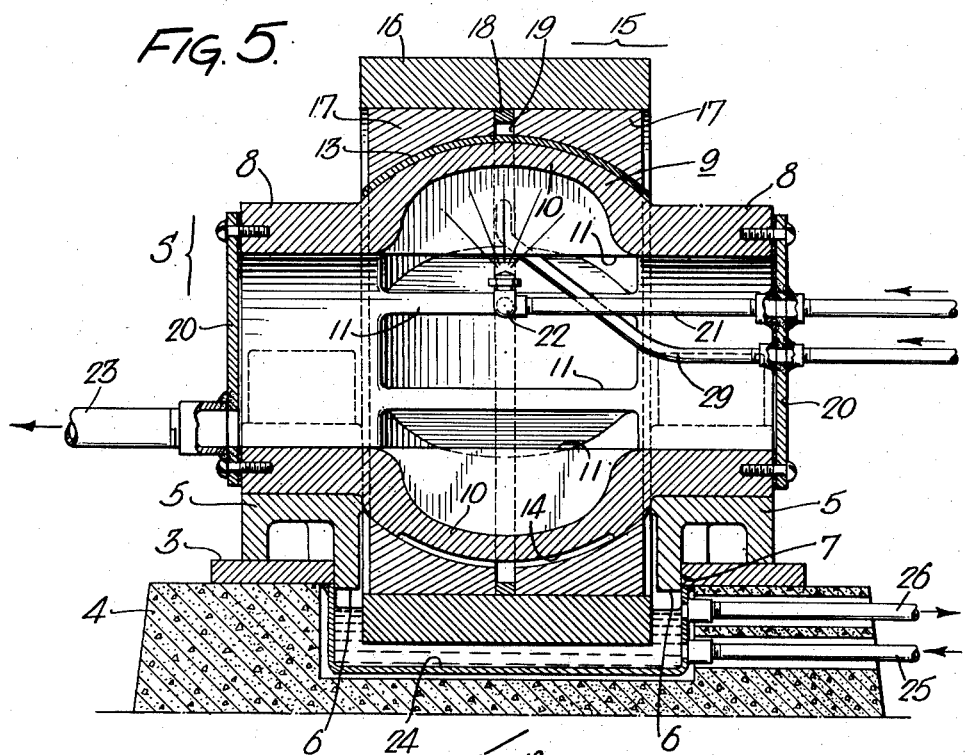
Fig. 5 is an enlarged sectional view on line 5—5, Fig. 3.

Referring now to the drawings, the present invention is shown in conjunction with a conventional type rotary kiln 1 having the usual riding rings secured circumferentially thereof, one of which is indicated by the reference numeral 2. In accordance with customary practice the kiln 1 has a pitch of between about 3/8" to 3/4" per foot of length of the kiln, and is rotatably supported by means of pairs of relatively spaced roller supports S which are associated with each riding ring 2. In addition to being supported by the roller supports S, the kiln is usually supported at its upper end by means of a thrust roller which is associated with the uppermost riding ring 2 on the kiln adjacent the usual driving gear. The roller supports, and in the case of the uppermost riding ring, the roller supports and thrust roller may be employed in unitary assemblies and mounted upon suitable bed plates secured upon suitable foundations or base structures, for example, of concrete, having a pitch corresponding to the pitch of the kiln. Since the present invention involves improvements in both the roller supports and thrust rollers, the invention will be described with relation to a combined roller support and thrust roller assembly for the uppermost riding ring 2 of a kiln, it being borne in mind that assemblies comprising pairs of the roller supports S alone will be provided for some or all of the other riding rings 2 of the kiln and that assemblies comprising the thrust roller alone likewise may be provided as desired.

Figure 6:
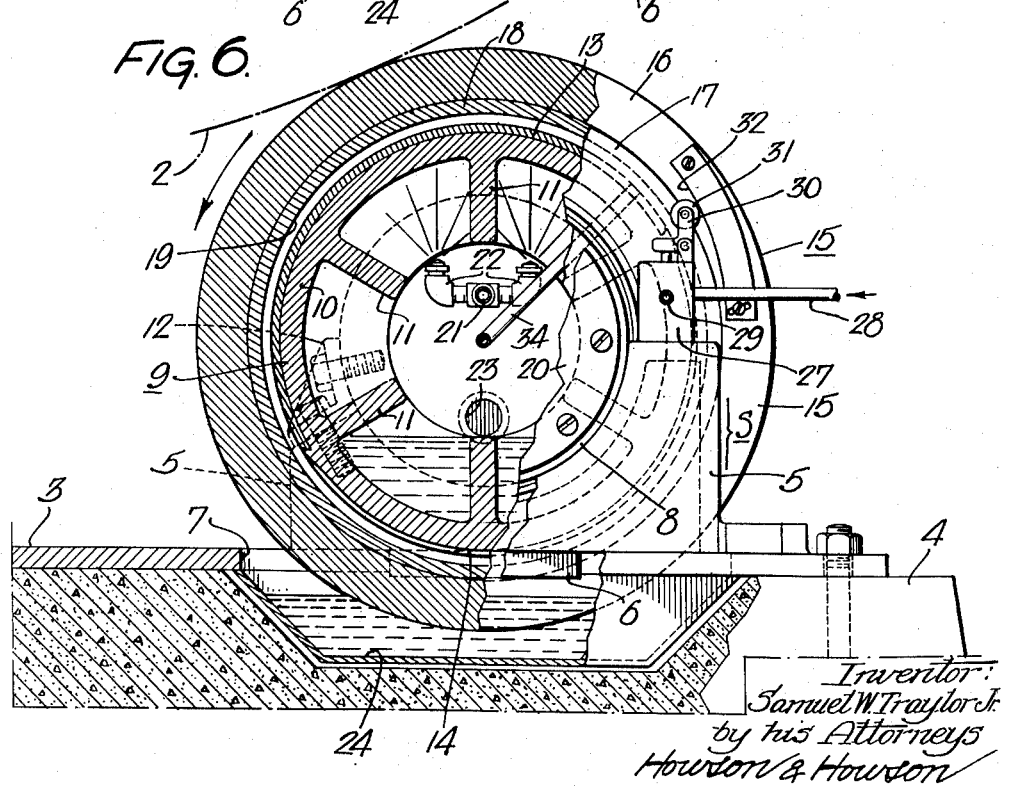
Fig. 6 is an enlarged sectional view on line 6—6, Fig. 3.

With reference more particularly to Figs. 5 and 6 of the drawings, each of the roller support structures S comprises a pair of mounting saddles 5 which are bolted or otherwise fixedly secured upon the bed plate 3. These saddles 5 are arranged in predetermined spaced relation (Fig. 5) and are prevented from spreading laterally by means of lugs 6 thereon which engage inwardly of an opening 7 provided in the bed plate 3. As shown in Figs. 2 and 6, the saddles 5 provide angularly disposed approximately semi-circular supporting surfaces for the opposite end portions 8 of a bearing member 9.

The bearing member 9 is of hollow relatively heavy construction and intermediate its opposite end portions 8 and the supporting saddles 5 said member is provided with an enlarged portion 10 which is the section of a sphere that has its center lying in the longitudinal axis of the bearing member 9. As previously stated the member 9 is hollow and the enlarged central spherical section thereof is suitably reinforced and strengthened by means of a plurality of circumferentially arranged ribs 11. In accordance with the present invention the bearing member 9 is intended to remain fixed or stationary with respect to its supporting saddles and the weight of the bearing member and suitable clamp devices 12 serve to secure the said member against rotation in the saddles 5.

Extending about the spherical section 10 of the bearing member for substantially 180° of the circumference thereof is a surface bearing metal 13 such as, for example, babbitt, bronze or other suitable material. This substantially semi-circular extent of the bearing metal 13 is arranged circumferentially of the spherical portion 10 so that its arcuate center is approximately in radial alignment with point of contact of the riding ring 2 upon the roller support assemblies S, for example, as shown in Fig. 6 of the drawing. The remainder of the circumference of the spherical section 10 has a radius equal to that of the bearing metal surfaced portion thereof and this unsurfaced portion of the circumference is provided with a circumferentially extending centrally located recess 14 of substantial width as shown in Fig. 5 of the drawings.

Rotatably mounted upon the spherical section 10 of the fixed bearing member 9 is a roller support, generally designated 15, which comprises an outer annular tire member 16 and a pair of inner annular supporting rings 17. The annular supporting rings 17 have a cross-sectional shape as indicated in Fig. 5 of the drawings for contact with the spherical bearing section 10. The rings 17 are press-fitted into the tire 16 and are relatively spaced apart by means of an annular spacer ring 18 arranged in juxtaposition to the tire inner surface in order to provide a groove 19, for lubrication purposes, which extends entirely circumferentially of the spherical bearing section 10. It will be obvious of course that the dimensions of the ring 17 and of the spacer 18 must be accurate in order that the former will properly seat upon the spherical bearing surface.

The support roller assembly 15 is adapted to rotate circumferentially upon the fixed bearing section 10. In addition, the overall transverse dimension of the rings 17 is less than the arcuate width of the spherical bearing surface of the section 10 so that limited rotation of the roller assembly 15 is provided in a direction transversely of the bearing section 10 between limit positions at opposite sides of the center position shown in Fig. 5. By this construction, the roller supports 15 are self-aligning upon the bearing section 10 with respect to any slight misalignment of the kilns and their riding rings 2.

In accordance with the present invention, the bearing member 9 is adapted to be cooled by discharging interiorly thereof a suitable cooling liquid such as, for example, water. For this purpose, the hollow bearing member 9 is closed at its opposite ends by means of plates 20. Cooling liquid is introduced into the bearing member by means of a pipe 21 which passes through one of the end plates 20 and is provided with upwardly directed discharge nozzles 22 arranged to discharge the cooling liquid, for example, against the inner surface of the upper portion of the spherical section 10 as shown in Figs. 5 and 6 of the drawings. Cooling liquid discharged into the bearing member 9 collects in the lower portion of the member and drains off through a pipe 23 which passes outwardly through the other end plate 20.

In addition, the periphery of the tire 16 of the roller assembly 15 is cooled by providing in the base or foundation 4 a sump or the like 24 in which the tire 16 travels during rotation thereof circumferentially about the fixed bearing member. Cooling liquid is circulated within the sump 24 by means of suitable pipes 25 and 26.

Lubrication of the bearing surface is accomplished by a pressure lubricating system of the "shot" type comprising a lubricant pump 27 connected by a pipe 28 to a suitable lubricant supply and by a pipe 29 to the bearing. The pump 27 is actuated by a member 30 which carries a roller 31 disposed in the path of travel of a cam strip 32 that is secured to and carried by the tire 16 of the support roller assembly 15. From the described construction and arrangement it will be observed that upon rotation of the support roller assembly 15, the cam 32 will operate to actuate the member 30 and in turn cause the pump 27 to discharge a "shot" of lubricant into the groove 19.

The use of self-aligning bearing constructions for the roller supports as described generally makes it necessary to use a thrust roller at the downhill side of the uppermost riding ring 2 only because there can be no misalignment between the riding rings 2 and roller supports S which might tend to spiral or twist the kiln in the uphill direction. Moreover, the end thrust of a kiln in the downhill direction can be accurately calculated thus permitting a thrust roller to be properly designed to carry the calculated thrust.

With reference to Fig. 4 of the drawings, there is illustrated a novel thrust roller construction T which comprises a bearing housing member 36 which is bolted or otherwise secured to the bed plate 3 upon the foundation or base 4. The housing member 36 is braced or reinforced against the thrust of the riding ring 2 as indicated at 37. Formed in the housing 36 is a vertically extending stepped bearing well 38 in which are secured bushings 39 and 40 of bronze or other suitable material. Journaled in the bushings 39 and 40 is the hollow stepped hub portion 41 of a thrust member 42 which has a roll portion 43 at its upper end arranged above the housing member 36 with its peripheral circumference disposed in rolling engagement with the riding ring 2. An annular ring 44 of bronze or the like supports the lower end of the hub 41 in the housing 36.

The bushings 39 and 40 may be lubricated by a system of lubrication substantially similar to that previously described with relation to the roller supports S. To this end, pipes 45 and 46 lead to the bushings 39 and 40. In addition to lubrication, and thrust member 42 and its bearings 39 and 40 are cooled by introducing internally of the member 42 a cooling liquid such as water. For this purpose a pipe 47 extends upwardly within the hub 41 and is provided with a spray head or other suitable outlet which discharges the liquid, for example, laterally against the inner walls of the hub as shown. The hub being hollow, the discharged water descends to the bottom of the bearing well in the housing 36 and is drained off therefrom through a suitable pipe 48.

From the foregoing it will be apparent that the present invention provides a novel self-aligning bearing construction and roller support for rotary kilns and like equipment which completely eliminates any possibility of misalignment between the riding ring and said roller supports. The invention also provides a novel thrust roller and bearing construction which may be designed to support the calculated loads at the downhill side of the riding ring. The invention further provides bearing constructions having means for liquid cooling the interior thereof together with means for effecting forced lubrication of the bearing parts.

While a particular embodiment of the invention has been illustrated and described herein it is not intended to limit the invention to the present disclosure and changes and modifications may be made within the scope of the following claims.

I claim:

1. In a roller support and thrust roller assembly, a pair of rotatable roller supports arranged in relatively spaced relation with their axes parallel to each other, a thrust roller intermediate and to one side of said roller supports and rotatable about an axis perpendicular to said roller support axes, non-rotatable hollow bearings for said roller supports, a non-rotatable bearing for said thrust collar, means to cool said bearings including devices to introduce cooling liquid interiorly of said hollow bearings and interiorly of said thrust roller, and means to supply cooling liquid continuously to said devices.

2. In a roller support and thrust roller assembly, a pair of rotatable roller supports arranged in relatively spaced relation with their axes parallel to each other, a thrust roller intermediate and to one side of said roller supports and rotatable about an axis perpendicular to said roller support axes, non-rotatable hollow bearings for said roller supports, a non-rotatable bearing for said thrust roller, means to cool said bearings including devices for introducing cooling liquid interiorly of said hollow bearings and interiorly of said thrust roller, a sump underlying each of said roller supports and through which the periphery of the latter is adapted to pass while rotating, and means to supply cooling liquid continuously to said devices and sump.

3. In a roller support and thrust roller assembly, a pair of rotatable roller supports arranged in relatively spaced relation with their axes parallel to each other, a thrust roller intermediate and to one side of said roller supports and rotatable about an axis perpendicular to said roller supporting axes, non-rotatable hollow bearings for said roller supports, a non-rotatable bearing for said thrust roller, a lubricant system including at least one pump associated with one of said roller supports operable to discharge lubricant to said bearings, means to cool said bearings including devices for introducing cooling liquid interiorly of said roller support hollow bearings and interiorly of said thrust roller, and said means to supply cooling liquid continuously to said devices.

4. In a roller support and thrust roller assembly, a pair of rotatable roller supports arranged in relatively spaced relation with their axes parallel to each other, a thrust roller intermediate and to one side of said roller supports and rotatable about an axis perpendicular to said roller support axes, non-rotatable hollow bearings for said roller supports, a non-rotatable bearing for said thrust roller, a lubricant system including at least one pump associated with one of said roller supports operable to discharge lubricant to said bearings, means to operate said pump including cam means on said roller support operable upon rotation thereof to effect actuation of said pump, means to cool said bearings including devices for introducing cooling liquid interiorly of said roller support hollow bearings and interiorly of said thrust roller, and means to supply cooling liquid continuously to said devices.

5. In a roller support and thrust roller assembly, a pair of rotatable roller supports arranged in relatively spaced relation with their axes parallel to each other, a thrust roller intermediate and to one side of said roller supports and rotatable about an axis perpendicular to said roller support axes, non-rotatable hollow bearings for said roller supports, a non-rotatable bearing for said thrust roller, a lubricant system including at least one pump associated with one of said roller supports operable to discharge lubricant to said bearings, means to operate said pump including cam means on said roller support operable upon rotation thereof to effect actuation of said pump, means to cool said bearings including devices for introducing cooling liquid interiorly of said roller support hollow bearings and interiorly of said thrust roller, a sump underlying each of said roller supports and through which the periphery of the latter is adapted to pass while rotating, and means to supply cooling liquid continuously to said devices and sump.

6. In a rotatable mounting, a non-rotatable bearing member having an enlarged bearing portion provided with a surface the section of a sphere, a roller support journaled on said spherical bearing portion and providing a channel for lubricant extending entirely circumferentially of the spherical bearing surface, a lubricant recess in the surface of said spherical portion and extending circumferentially thereof in communication with said channel, and a lubricant system including a pump operable to discharge lubricant into said channel and maintain the latter and said recess filled with lubricant.

7. In a rotatable mounting a hollow non-rotatable bearing member having an enlarged bearing portion provided with a surface the section of a sphere, a roller support journaled on said spherical bearing portion and providing a channel for lubricant extending entirely circumferentially of the spherical bearing surface, a lubricant system including a pump operable to discharge lubricant into said channel and maintain the latter and said recess filled with lubricant, and means to introduce a liquid coolant interiorly of the bearing member.

8. In a rotatable mounting, a non-rotatable bearing member having an enlarged bearing portion provided with a surface the section of a sphere, a roller support journaled on said spherical bearing portion and providing a channel for lubricant extending entirely circumferentially of the spherical bearing surface, a lubricant system including a pump operable to discharge lubricant into said channel and maintain the latter and said recess filled with lubricant, and means to operate said pump including cam means on said roller support rotatable therewith and operable during rotation thereof to effect actuation of said pump.

9. In a rotatable mounting, a hollow non-rotatable bearing member having an enlarged bearing portion provided with a surface the section of a sphere, a roller support journaled on said spherical bearing portion and providing a channel for lubricant extending entirely circumferentially of the spherical bearing surface, a lubricant system including a pump operable to discharge lubricant into said channel and maintain the latter and said recess filled with lubricant, means to operate said pump including cam means on said roller support rotatable therewith and operable during rotation thereof to effect actuation of said pump, and means to circulate a liquid coolant interiorly of the bearing member.

10. In a rotatable mounting, a pair of supporting saddles fixedly secured on said base in predetermined spaced parallel relation, a non-rotatable bearing member having opposite end portions thereof secured in said saddles and having an enlarged intermediate bearing portion provided with a surface the section of a sphere, a roller support journaled on said spherical bearing portion and providing a channel for lubricant extending entirely circumferentially of the spherical bearing surface, a lubricant recess in the surface of said spherical portion in communication with said channel, a lubricant system including a pump associated with one of said saddles operable to discharge lubricant into said channel and maintain the latter and said secess filled with lubricant, and means to operate said pump including cam means on said roller support rotatable therewith and operable to effect actuation of said pump.

11. In a rotatable mounting, a pair of supporting saddles fixedly secured in predetermined spaced parallel relation, a non-rotatable bearing member having opposite end portions thereof secured in said saddles and having an enlarged intermediate bearing portion provided with a surface the section of a sphere, and a roller support journaled on said spherical bearing portion and including an outer tire member and a pair of annular supporting rings fitted interiorly of said tire and having transversely arcuate inner surfaces in bearing engagement with the surface of said spherical bearing portion.

12. In a rotatable mounting, a pair of supporting saddles fixedly secured in predetermined spaced parallel relation, a non-rotatable bearing member having opposite end portions thereof secured in said saddles and having an enlarged intermediate bearing portion provided with a surface the section of a sphere, a roller support journaled on said spherical bearing portion and including an outer tire member and a pair of annular supporting rings fitted interiorly of said tire and having transversely arcuate inner surfaces in bearing engagement with the surface of said spherical bearing portion, said supporting rings being predeterminedly spaced apart and providing therebetween a channel for lubricant extending entirely circumferentially of the spherical bearing surface.

13. In a rotatable mounting, a pair of supporting saddles fixedly secured in predetermined spaced parallel relation, a non-rotatable bearing member having opposite end portions thereof secured in said saddles and having an enlarged intermediate bearing portion provided with a surface the section of a sphere, a roller support journaled on said spherical bearing portion and including an outer tire member and a pair of annular supporting rings fitted interiorly of said tire and having transversely arcuate inner surfaces in bearing engagement with the surface of said spherical bearing portion and providing therebetween a channel for lubricant extending entirely circumferentially of the spherical bearing surface.

14. In a bearing construction, a housing member having a vertically disposed bearing well therein, a thrust roller having a hollow hub portion rotatably journaled in said well, a bearing in the bottom of said well rotatably supporting the end of said hub portion, means to lubricate the bearing surfaces of said well and hub including a pump operable intermittently to discharge lubricant thereto, and means to cool said bearing surfaces including a spray for cooling liquid arranged interiorly of the hub portion.

15. In a bearing construction, a housing member having a vertically disposed stepped bearing well therein, bushings in the respective stepped portions of the well, a thrust roller having a hollow hub portion correspondingly stepped and rotatably journaled in said well, means to cool said bushings including a spray for cooling liquid arranged interiorly of the hub portion, and means to supply cooling liquid continuously to said spray.

16. In a bearing construction, a housing member having a vertically disposed stepped bearing well therein, bushings in the respective stepped portions of the well, a thrust roller having a hollow hub portion correspondingly stepped and rotatably journaled in said well, means to lubricate said bushings including a pump operable periodically to discharge lubricant thereto, means to cool said bushings including a spray for cooling liquid arranged interiorly of the hub portion, and means to supply cooling liquid continuously to said spray.

SAMUEL W. TRAYLOR, Jr.

REFERENCES CITED

The following references are of record in the file of this patent:

UNITED STATES PATENTS

| Number | Name | Date |
|---|---|---|
| 211,796 | Schwendler | Jan. 28, 1879 |
| 703,134 | King | June 24, 1902 |
| 1,012,018 | Sargent | Dec. 19, 1911 |
| 1,290,313 | O'Connor | Jan. 7, 1919 |
| 1,479,173 | Cole et al. | Jan. 1, 1924 |
| 1,492,653 | Sears | May 6, 1924 |
| 1,666,436 | Bernhard | Apr. 17, 1928 |
| 2,184,197 | Schutte | Dec. 19, 1939 |
| 2,260,321 | How | Oct. 28, 1941 |
| 2,310,473 | Svendsen | Feb. 9, 1943 |
| 2,400,506 | Heim | May 21, 1946 |

FOREIGN PATENTS

| Number | Country | Date |
|---|---|---|
| 225,175 | Great Britain | June 18, 1925 |